United States Patent [19]

Kajimura

[11] Patent Number: 5,760,300

[45] Date of Patent: Jun. 2, 1998

[54] SCANNING PROBE MICROSCOPE

[75] Inventor: Hiroshi Kajimura, Tokyo, Japan

[73] Assignee: Olympus Optical Co., Ltd., Tokyo, Japan

[21] Appl. No.: 848,662

[22] Filed: Apr. 29, 1997

Related U.S. Application Data

[63] Continuation of Ser. No. 497,746, Jul. 3, 1995, abandoned.

[30] Foreign Application Priority Data

Jul. 6, 1994 [JP] Japan ................................. 6-176210

[51] Int. Cl.⁶ .................................................. G01B 5/28
[52] U.S. Cl. ................................................................ 73/73
[58] Field of Search ............................... 73/105; 250/306

[56] References Cited

U.S. PATENT DOCUMENTS

| | | | |
|---|---|---|---|
| 4,935,634 | 6/1990 | Hansma et al. | |
| 5,267,471 | 12/1993 | Abraham et al. | 73/105 |
| 5,276,672 | 1/1994 | Miyazaki et al. | 73/105 X |
| 5,291,775 | 3/1994 | Gamb et al. | 73/105 |
| 5,294,804 | 3/1994 | Kajima | 250/306 X |
| 5,319,960 | 6/1994 | Gamble et al. | 73/105 |
| 5,319,977 | 6/1994 | Quate et al. | 73/620 X |
| 5,412,980 | 5/1995 | Elings et al. | 73/105 |
| 5,463,897 | 11/1995 | Prater et al. | 73/105 |
| 5,519,212 | 5/1996 | Elings et al. | 73/105 X |

FOREIGN PATENT DOCUMENTS 0 290 648 B1 3/1992 European Pat. Off. .
0 440 268 B1 8/1994 European Pat. Off. .
0 442 536 B1 8/1994 European Pat. Off. .

OTHER PUBLICATIONS

Stemme, "Resonant Silicon Sensors", J. Micromech. Microeng., vol. 1, 1991, pp. 113–125.

Albrecht et al., "MicroFabrication of Cantilever Styli for the Atomic Force Microscope", J. Vac. Sci. Technol., A8 (4), Jul./Aug. 1990, pp. 3386–3395.

Baselt et al., "Scanned—Cantilever Atomic Force Microscope", Rev. Sci. Instrum., 64(4), Apr. 1993, pp. 908–911.

Chalmers et al., "Determination of Tilted Superlattice Structure by Atomic Force Microscopy", Applied Physics Letters, vol. 55, No. 24, Dec. 1989, pp. 90–92.

(List continued on next page.)

Primary Examiner—Hezron E. Williams
Assistant Examiner—Daniel S. Larkin
Attorney, Agent, or Firm—Armstrong, Westerman, Hattori, McLeland & Naughton

[57] ABSTRACT

A probing apparatus having an elastic body supported by a support and provided with a probe at its free end. The elastic body is disposed in a solution in which a sample is held. The elastic body is forcibly oscillated at its natural frequency by a driving source. A displacement detecting device detects a variation in the oscillation state of the elastic body which takes place when the tip of the probe is placed in the vicinity of the surface of the sample. The detected output from the displacement detecting device is fed to a sample data monitor device to provide a topographic image thereon.

12 Claims, 5 Drawing Sheets

OTHER PUBLICATIONS

Drake et al., "Imaging Crystals, Polymers, and Processes in Water with the Atomic Force Microscope", Science, vol. 243, 24 Mar. 1989, pp. 1586–1589.

Hansma et al., "Tapping Mode Atomic Force Microscopy in Liquids", Appl. Phys. Lett., vol. 64, No. 13, 28 Mar. 1994, pp. 1738–1740.

Hobbs et al., "Atomic Force Microscope: Implementations", Scanning Microscopy Technologies and Applications, SPIE vol. 897, 1988, pp. 26–30.

Hoh et al., "Atomic Force Microscopy for High–Resolution Imaging in Cell Biology," Miscellanea.

Hues et al., "Scanning Probe Microscopy of Thin Films", MRS Bulletin, Jan. 1993, pp. 41–49.

Maivald et al., "Using Force Modulation to Image Surface Elasticities with the Atomic Force Microscope," Nanotechnology, vol. 2, 1991, pp. 103–106.

Martin et al., "Atomic Force Microscope—Force Mapping and Profiling on a Sub 100–Å Scale", J. Appl. Phys. vol. 61, No. 10, 15 May 1987, pp. 4723–4729.

Obnesorge et al., "True Atomic Resolution by Atomic Force Microscopy Through Repulsive and Attrative Forces," Science, vol. 260, 4 Jun. 1993, pp. 1452–1456.

Prater et al., "Tapping Mode Atomic Force Microscopy—Applications to Semiconductors," Inst. Phys. Conf. Ser. No. 135, Chapter 2, 1993, pp. 69–72.

Radmacher et al., "From Molecules to Cells: Imaging Soft Samples with the Atomic Force Microscope," Science, vol. 257, 25 Sep. 1992, pp. 1900–1905.

Takata, "Novel Method for Detecting Resonant Frequery shift in Atomic Force Microscopy", Jpn. J. Appl. Phys., vol. 32, Part I, No. 53, May 1993, pp. 2455–2458.

SCANNING PROBE MICROSCOPE

This application is a continuation of application Ser. No. 08/497,746, filed Jul. 3, 1995, now abandoned.

BACKGROUND OF THE INVENTION

1. Field of the Invention

The present invention relates to a probing apparatus for use in an atomic force microscope (AFM) or other similar instruments, for example, a scanning tunneling microscope (STM), a scanning near field optical microscope (SNOM), etc., and, in particular, to a probing apparatus which makes high resolution measurements to a sample set up in a viscous liquid without presenting any deformation to the sample.

2. Description of the Related Art

There is known in the prior art an atomic force microscope (AFM) which detects the displacement that takes place in an elastic body supporting the probe of the AFM by picking up atomic forces exerted between a sample and the tip of the probe in the vicinity of the sample in order to collect surface roughness information of the sample. Methods available to detect the displacement that takes place in the elastic body in the AFM are the light interference method, the light focusing method, the optical lever method and the like. Among these methods, the optical lever method is in widespread use because of its simple construction and high sensitivity of measurement. In the optical lever method, light is projected onto a portion of the sample where its displacement is a maximum, and a light reflected off is monitored and used to determine a change in the microscopic displacement in the elastic body.

There is an increasing demand for the measurement in connection with an organic sample, in a liquid, such as cells, cell membranes, and DNA. For example, U.S. Pat. No. 4,935,634 discloses an AFM which is provided with a scanning probe enclosed in a liquid cell. In the disclosed AFM, the elastic body disposed in the liquid cell comprises an optical lever pickup system composed of a laser beam source and a light pickup device. The sample is disposed in the liquid on a micromotion device incorporating a piezoelectric element. The elastic body relatively scans the sample that is driven by the micromotion device. In the course of scanning, the displacement signal of the elastic body derived from the light pickup device is converted into image data, and thus a high-resolution topographic image of the surface of the sample is obtained.

In the measurement of an organic sample in a liquid, such as cells, cell membranes or DNA, the spring constant k(c) of a cantilever constituting the elastic body supporting a probe may be greater than the spring constant k(b) of the cell membrane that is also elastic, namely, k(c)>k(b). In this case, with the probe being mutually closer to the sample, they are put into contact so that both spring forces balance in an atomic force F. Namely, the relationship F=k(c)×d(c)=k(b)×d(b) is established, where d(c) represents a displacement of the cantilever and d(b) represents a displacement of a cell membrane. Now, if the displacement d(b) of the cell membrane is ten times greater than the displacement d(c) of the cantilever [d(b)/d(c)>10], the cantilever distorts the cell before the cantilever reaches its predetermined detected displacement.

To avoid such a problem, for example, Japanese Patent Application Laid-open No. Sho-63-309802 employs a non-contact mode measurement (using attractive force: van der Waals force) rather than the prior art contact mode measurement (using repulsive force) in which the cantilever is in contact with the sample. The non-contact mode measurement is based on the vibration mechanic principle that, when the cantilever is oscillating at its resonant frequency, the tip of the probe supported by the cantilever is placed close to the surface of the sample until the separation therebetween is 1 to 10 nm, and the van der Waals force from the surface of the sample works on the tip of the probe thereby lowering the resonant frequency of the cantilever. The non-contact mode measurement thus measures the surface geometry of the sample before the sample, such as an organic tissue, is distorted. In order to increase a change of a resonant frequency of a cantilever by van der Waals force, this method typically employs a cantilever having a large Q, for example, one with a resonant frequency of 50 kHz or higher and a spring constant of 1 N/m or greater. The quality factor Q represents a measure of damping of an oscillation system, where $Q=1/(2\zeta)$ and $\zeta$ is the damping ratio. Advantageously useful to pick up the change in resonant frequency is a light pickup technique wherein a portion of the cantilever that gives a maximum amplitude of oscillation is used in measurement. Also available are a capacitance change pickup technique and a resistance change pickup technique that picks up a change in resistance of a piezoelectric element contained in the elastic body.

As described above, the non-contact mode measurement is advantageously applied to a sample of which the surface exhibits elasticity. However, there is a case where a sample is held in a liquid. In an organic sample, cells are living in water moisture. If water moisture surrounding each cell evaporates, water moisture inside the cells is transferred out of the cells through their membranes and the cell dries. To observe the surface geometry of the organic sample in situ using an AFM, the organic sample, such as cells or the like, must be held in an aqueous solution or organic solvents.

When such an organic sample is measured in a liquid in the non-contact mode, the following problem arises. A non-contact mode cantilever having a high resonant frequency, for example 50 kHz, is commercially available from NANO PROBE Co. This cantilever is produced by etching a silicon substrate into a cantilever part, a cantilever support and a probe. The cantilever is 100 to 300 µm long and 5 µm thick. The length of the probe is as short as 10 to 15 µm. When the tip of the probe is placed closer to the sample in the liquid, the entire cantilever and its support, as well, are dipped into the liquid.

In the non-contact mode, the cantilever, namely, the elastic body has a free end that is allowed inertia motion of recovery property capable of storing potential energy in oscillation. When the cantilever is driven in a resonant motion at a resonant frequency in vacuum or in air that has a low viscous resistance value, no energy dissipation due to viscous resistance takes place, no damping in the amplitude of the oscillation takes place, and sinusoidal driving is thus sustained.

If the cantilever oscillates in a liquid or in a viscous gas, the amplitude of oscillation is thereby decreased, because the viscous resistance or damping force is proportional to an effective area at a right angle to the direction of the oscillation and a velocity of the oscillation. When the cantilever is driven in a viscous liquid, viscous resistance is exerted on the entire area of the cantilever. As the cantilever runs from its fixed end to its free end, the amplitude of oscillation is increased, angular velocity is increased, more energy dissipation results, the amplitude of oscillation is accordingly lowered, and the oscillation is restricted. The van der Waals forces from the surface of the sample expected in the non-contact mode are thus overwhelmed by the force generated by viscous resistance, and cannot be picked up.

SUMMARY OF THE INVENTION

The present invention has been developed to solve the above problem associated with the prior art probe of non-contact mode measurement. It is a primary object of the present invention to provide a probing apparatus capable of making a non-contact mode measurement to a sample held in a liquid without distorting the sample. The probing apparatus is of a type for use in an atomic force microscope (AFM) which gives a topographic image of the sample by converting an atomic force exerted between the sample and the tip of a probe supported by an elastic body into a variation in oscillation of the elastic body and by controlling the clearance between the sample and the probe so that the variation is kept constant.

The present invention achieves the above primary object by imparting an elasticity to an elastic body having a probe on its free end to the extent that the elastic body remains oscillatory at its natural frequency in a forced manner in a liquid and by setting up a driving source for oscillating the elastic body such that the driving source forcibly oscillates the elastic body in the vicinity of its natural frequency in the liquid.

In the probing apparatus thus described, the elastic body has an elasticity to the extent that it is forcibly oscillatory at its natural frequency in the liquid, and the elastic body is forcibly driven in the vicinity of its natural frequency by the driving source. Thus, the amplitude of oscillation at the free end of the elastic body is kept to a minimum, energy dissipation by viscous resistance is minimized, and the oscillation of the elastic body is sustained in the vicinity of its natural frequency. The probing apparatus thus makes a non-contact measurement to the sample even in the viscous liquid without distorting the sample.

It is another object of the present invention to provide a probing apparatus that makes a non-contact measurement to a sample even in a viscous liquid with energy dissipation by minimizing viscous resistance.

The present invention achieves this object by allowing the elastic body to oscillate in a harmonic resonance mode so that the area of the elastic body that oscillates at its maximum amplitude is reduced.

It is yet another object of the present invention to provide a probing apparatus that allows its elastic body to oscillate in an efficient manner.

The present invention achieves this object by allowing the driving source to drive the elastic body at the vicinity of its free end via the liquid.

It is yet a further object of the present invention to provide a probing apparatus that allows the elastic body to oscillate by means of an acoustic wave in an efficient manner.

The present invention achieves this object by disposing an acoustic wave as the driving source in a manner that the source faces the elastic body in the vicinity of its free end.

It is yet a further object of the present invention to provide a probing apparatus that is further provided with a function capable of allowing the elastic body to oscillate even more efficiently.

The present invention achieves this object by constructing the elastic body of either a cantilever configuration or a dual fixed-end beam configuration.

It is yet a further object of the present invention to provide a probing apparatus that is further provided with a function capable of allowing the elastic body to oscillate even more efficiently.

The present invention achieves this object by configuring the elastic body so that resistance working on the area of the elastic body in oscillation is reduced. To this end, the area of the elastic body perpendicular to the direction of oscillation is partially varied and the transverse cross-section of the elastic body is partially varied. Also, to achieve the above object, the elastic body is furthermore configured so that the nodes of a harmonic of the natural oscillation of the elastic body is more subject to viscous resistance.

DETAILED DESCRIPTION OF THE PREFERRED EMBODIMENTS

Figure 1:
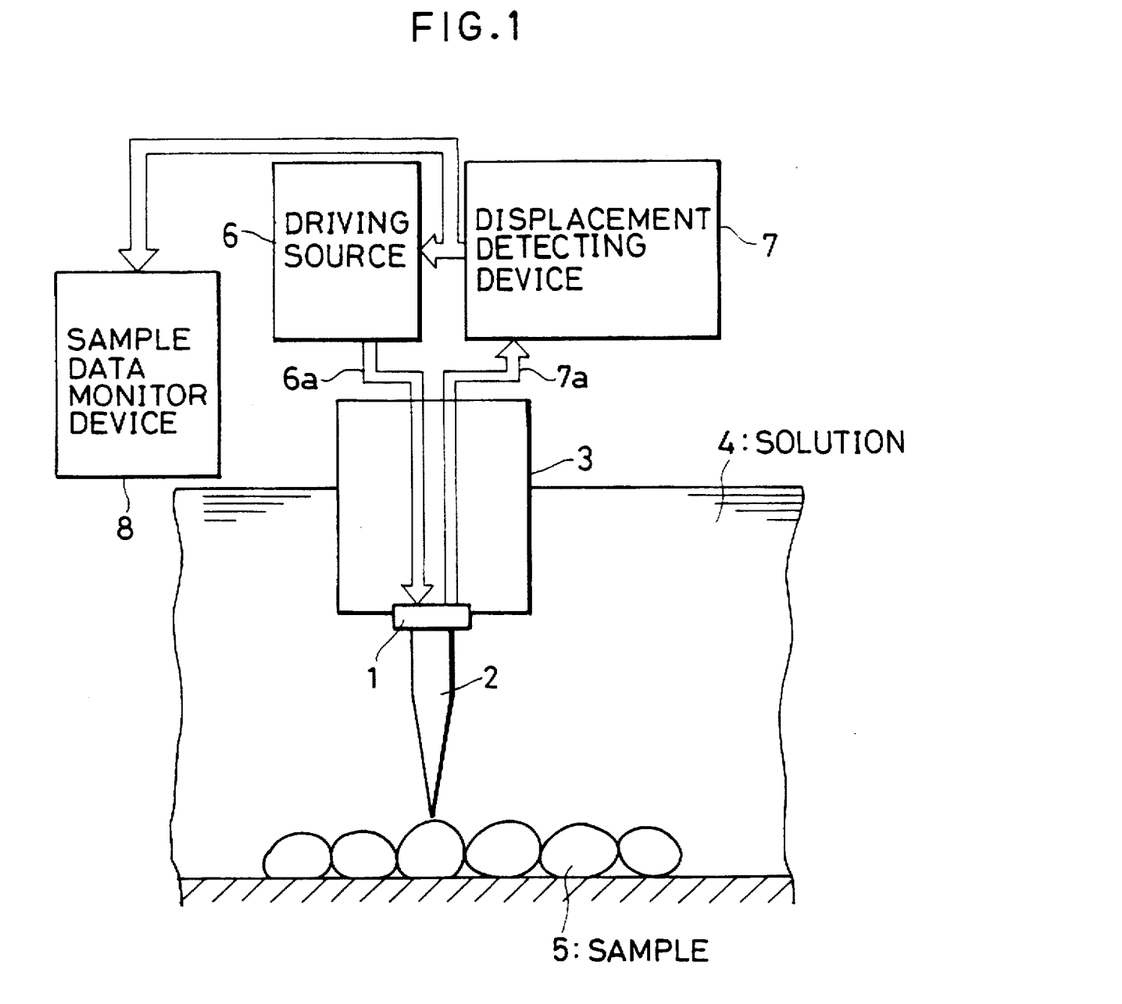
FIG. 1 shows the concept of the probing apparatus according to the present invention.

Referring now to the drawings, the embodiments of the present invention are discussed. FIG. 1 shows the concept of the present invention. As shown, an elastic body 1 is formed of a cantilever that is supported at one end, or a dual fixed-end beam or diaphragm that is supported at at least two points. The elastic body 1 is provided with a probe 2 on its free end. The elastic body 1 is supported by an elastic body support 3. Directly or indirectly coupled with the elastic body 1 is a driving source (oscillating energy source) 6 that periodically drives the elastic body 1 internally or from the outside. Driven by oscillating energy 6a derived from the driving source 6, the elastic body 1 oscillates with the loop at its free end and the node at its fixed end, with potential energy alternating with oscillating energy at the free end.

In the present invention, the elastic body 1 having the probe 2 on its free end is immersed in a solution 4 that holds a sample 5. The free end of the elastic body 1 is forcibly driven in a continuous manner in which oscillating energy dissipated by the viscosity of the liquid 4 is made up for by the energy supplied by the driving source 6. The dissipated oscillating energy is proportional to the square of the speed of a point of the oscillating elastic body.

The sample is put on a stage. The stage has a generally flat surface where any sample can be laid down. The stage has walls which surround the flat surface in order to hold a liquid.

A displacement detecting device 7 senses the oscillatory state of the elastic body 1. Designated 7a is a displacement signal which may be an electrical signal from a sensor (for example, of a type that employs a voltage across a piezoelectric transducer or a current through a piezoresistive element) built in the elastic body 1 or which may be a polarized light when a light beam is employed. The detected signal from the displacement detecting device 7 is fed back to the driving source 6 as required to sustain the forced oscillation. The detected signal from the device 7 is also fed to a sample data monitoring device 8.

Generally speaking, a spring (elastic body) having a spring constant of k is an elastic restoring element which has a restoring capability to restore the body to its equilibrium state. A restoring force f(x) is related with a displacement x by the following equation (1).

$$f(x)=kx \quad (1)$$

The spring disposed in a liquid is subjected to a damping force $F_d$ attributed to viscous resistance. The damping force $F_d$ is a function of velocity (dx/dt), and its direction is opposite that of velocity. The damping force $F_d$ is expressed by Equation (2) as follows:

$$F_d=-c(dx/dt) \quad (2)$$

where c represents a viscous damping coefficient.

When the spring is forced to vibrate by an oscillating force f(t), the following equation (3) holds.

$$m(d^2x/dt^2)=-c(dx/dt)-kx+f(t) \quad (3)$$

where m represents the mass of the free end of the spring (corresponding to the tip of the probe).

Equation (4) also holds.

$$(d^2x/dt^2)+2\zeta\omega_n(dx/dt)+\omega_n^2 x=\psi(t) \quad (4)$$

where $\omega_n$, represents natural frequency, namely, $(k/m)^{1/2}$, $\zeta$ represents damping ratio, namely, $$\zeta=c/[2(mk)^{1/2}], \text{ and } \psi(t)=f(t)/m.$$

Figure 2A:
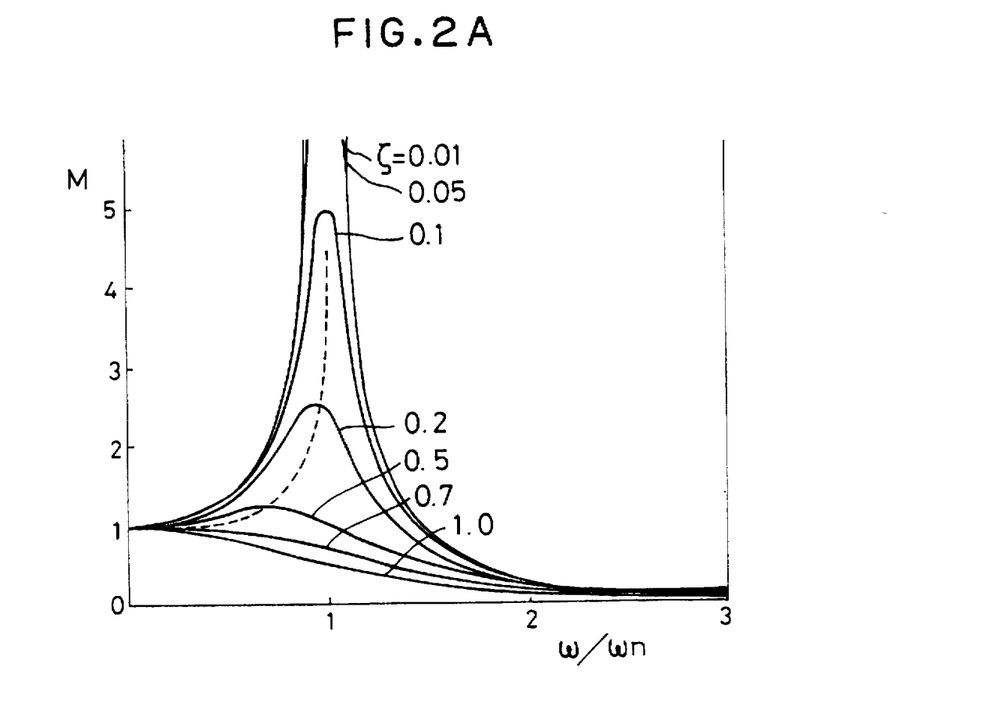
FIGS. 2A and 2B show resonance curves plotted with damping ratio as a parameter.
Figure 2B:
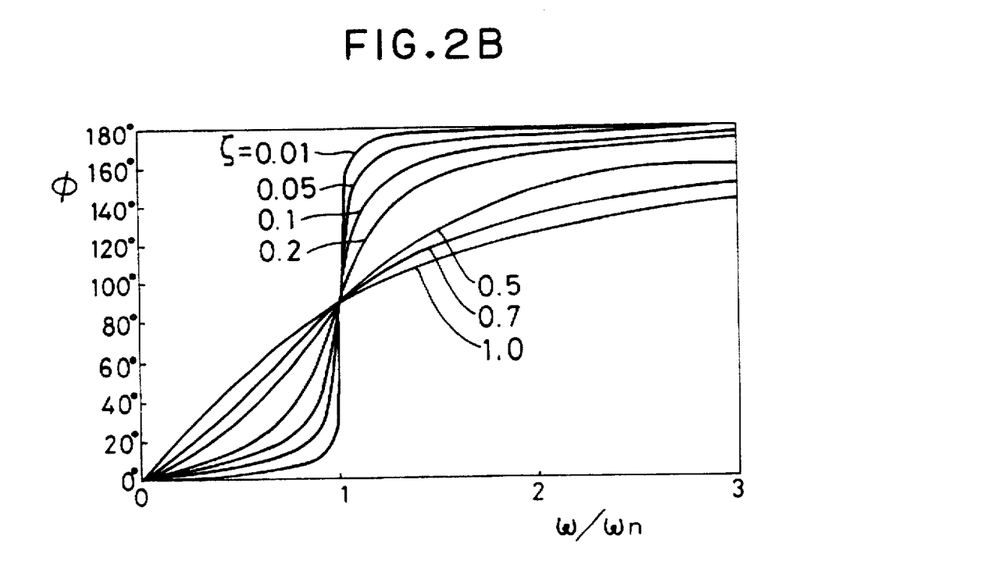

Under forced oscillation, driving force f(t) of steady-state oscillation is expressed by Equation (5) as follows:

$$f(t)=F' \cos(\omega t-\alpha) \quad (5)$$

where α represents initial phase angle. Displacement x(t) of the free end of the spring is expressed by the following Equation (6).

$$x(t)=X \cos(\omega t-\mu-\phi) \quad (6)$$

where, X is an amplitude that is expressed by the following Equation (7), and φ is a phase delay that is expressed by the following Equation (8).

$$X=X_o/[\{1-(\omega/\omega_n)^2\}^2+\{2\zeta\omega/\omega_n\}^2]^{1/2} \quad (7)$$

$$\phi=\tan^{-1}[c\omega/(k-m\omega)] \quad (8)$$

where $X_o$ represents the displacement of the mass (of the free end) when a force F is statically applied. Resonance curves obtained from Equation (6) are plotted in FIGS. 2A and 2B. In FIGS. 2A and 2B, $\omega/\omega_n$ is a ratio of oscillation frequencies, M is a ratio of amplitudes, and φ is a phase difference.

The Q value [Q=1/(2ζ)] may be used as a measure of damping of the oscillation system. The smaller the damping the larger the Q value and the higher the peak value of each resonance curve. Conversely, the greater the damping, the smaller the Q value and the lower the peak value of each resonance curve.

In the probing apparatus in the AFM in FIG. 1, the van der Waals force or the force governed by Paulis' law exerted between the probe 2 and the sample 5 in a solution 4, ranges from the order of pico-newtons to nano-newtons, and it is detected by a displacement of the elastic body. The detection of displacement results in variations in the amplitude of oscillation having a resolution of 0.01 to 1 nm or a variation in the phase of oscillation. It has been empirically determined that, when the elastic body is forcibly oscillated in the liquid, the damping energy per cycle is approximately proportional to the square of the amplitude of oscillation though being unrelated to the frequency of oscillation. Thus, it is not only difficult but also unnecessary to sustain a large amplitude oscillation at the free end of the elastic body. The free end is sustained at a micro-oscillation, the amplitude of which is as small as 0.1 nm or so.

In the forced oscillation, the signal f(t) expressed by the equation (5) and fed back to the driving source 6, leads by a phase φ the displacement x(t) of the displacement detecting device 7 expressed by the equation (6).

The displacement signal 7a is also used as a servo signal for the probe 2 to continuously trace the surface of the sample. Alternatively, the probe 2 is designed to approach the sample by a predetermined pitch in an intermittent manner to record a predetermined displacement signal and display it with respect to the axis representing a continuous position on the monitoring device 8. Thus, a topographic image results.

Figure 3:
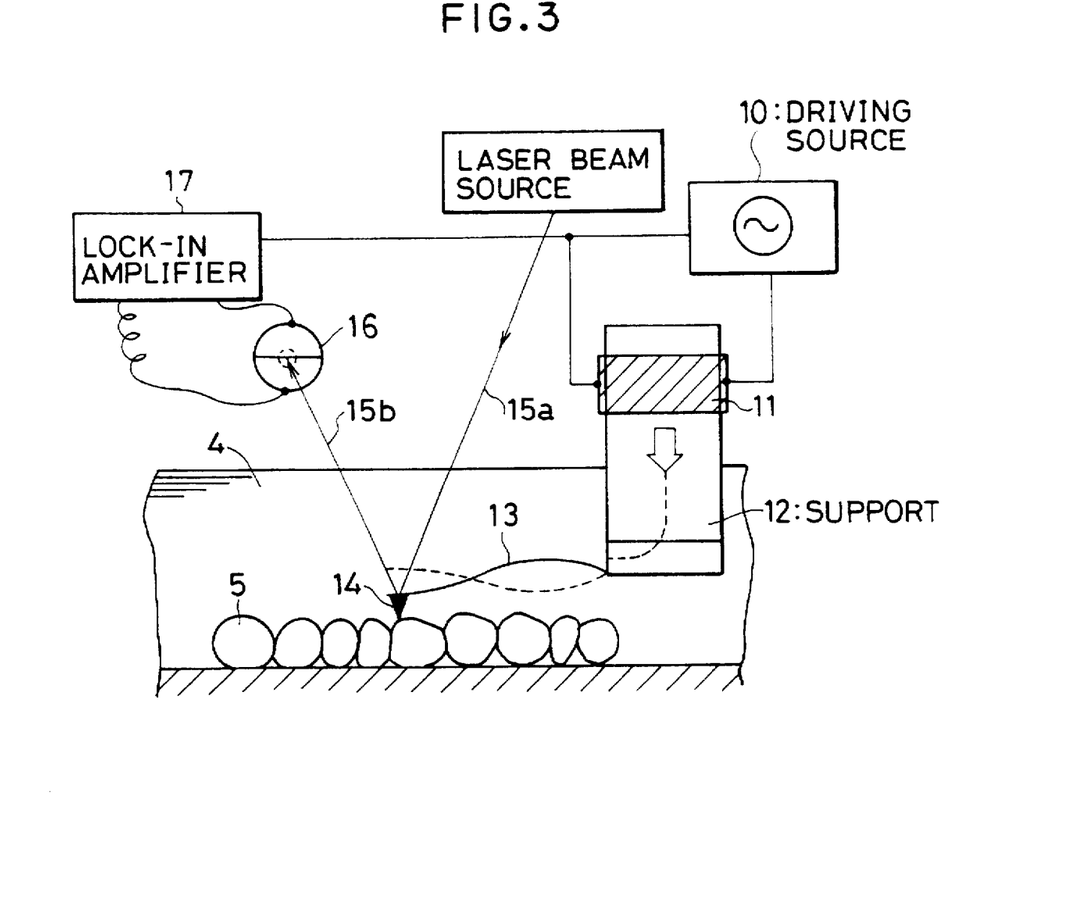
FIG. 3 shows an embodiment of the probing apparatus according to the present invention.

FIG. 3 illustrates an embodiment of the present invention. In this embodiment, a cantilever 13 as the elastic body having a probe 14 is supported by a support 12 in a liquid 4 in a manner such that the probe 14 faces a sample 5 that is held in the viscous liquid 4. The probe 14 is micro-oscillated by a piezoelectric element 11 disposed on the support 12. The piezoelectric element 11 is driven by a driving source 10. The cantilever 13 (elastic body) is driven at a fundamental resonant frequency $\omega_o$ or a harmonic frequency $\omega_H$, of its resonant frequency $\omega_o$, and in this embodiment, the cantilever 13 is driven at the third harmonic.

A change takes place in oscillation when the tip of the probe 14 is put in close proximity to the sample 5. That change is detected by a position sensor 16. The position sensor 16 picks up a reflected laser light 15b when the incident light 15a from a laser light beam source 15 is reflected off the free end of the cantilever 13. The displacement of the probe is expressed by Equation (6) when the driving force by Equation (5) is applied. A change in the angular frequency ω may be determined by a lock-in amplifier 17 or the like.

The above embodiment is characterized in that the cantilever 13 (elastic body) is driven at a harmonic oscillation mode in the viscous liquid 4. The van der Waals force or the force governed by Paulis' law works as a resisting force restricting oscillation action in a oscillatory system. As seen from Equation (2), $F_d=-c(dx/dt)$, the faster the relative velocity, dx/dt, of the tip of the probe 14 with respect to the sample 5 the greater the resisting force. It is thus preferred that the cantilever (elastic body) be driven at a harmonic of the resonant frequency.

Figure 4A:
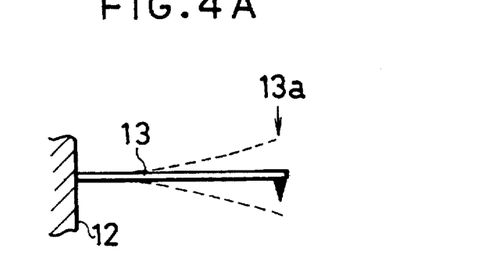
FIG. 4A shows the motive position of the cantilever driven at its fundamental mode in the embodiment of FIG. 3.
Figure 4B:
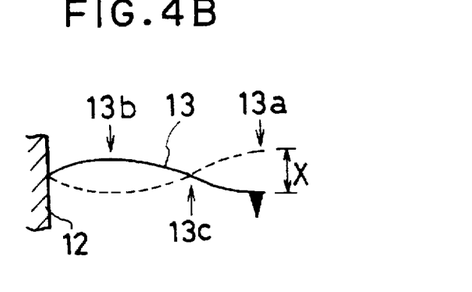
FIG. 4B shows the motive position of the cantilever driven at its third harmonic mode.

When driven at the harmonic oscillation mode, for example, at the third harmonic, the cantilever (elastic body) 13 presents a node 13c between its free end 13a and 13b as shown in FIG. 4B. The amplitude X at the free end in the harmonic oscillation mode is smaller than that in the fundamental oscillation mode as in FIG. 4A. The resulting damping is alleviated and the Q value is generally increased.

Referring to FIGS. 5A through 5D and 6A and 6B, the configuration of the elastic body preferred in view of oscillation in liquid is discussed. Let L represent the length, W, the width, t, the thickness, E, a Young's modulus, and ρ, linear density in the cantilever. Generally speaking, the natural (resonant) oscillation frequency $f_{res}$ is expressed by Equation (9) and spring constant k by Equation (10) as follows:

$$f_{res}=0.169\ E^{1/2}t/\rho L^2 \qquad (9)$$

$$k=Et^3W/4L^3 \qquad (10)$$

Figure 5A:
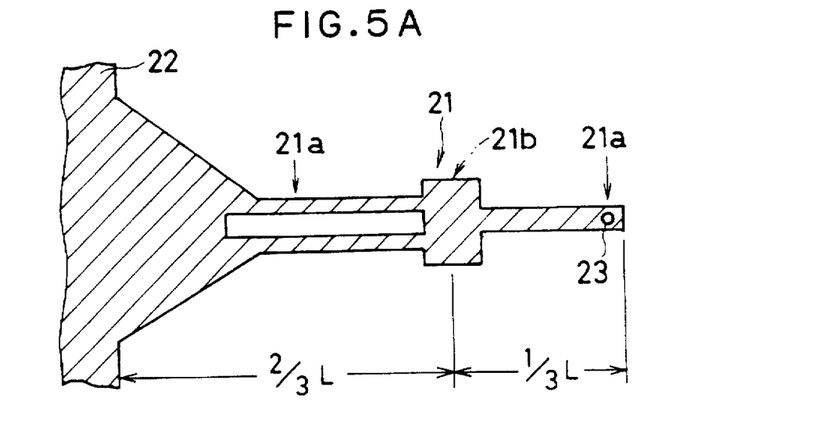
FIG. 5A is a plan view showing a theoretically and conceptionally preferred structure of the elastic body of the probing apparatus according to the present invention.
Figure 5B:
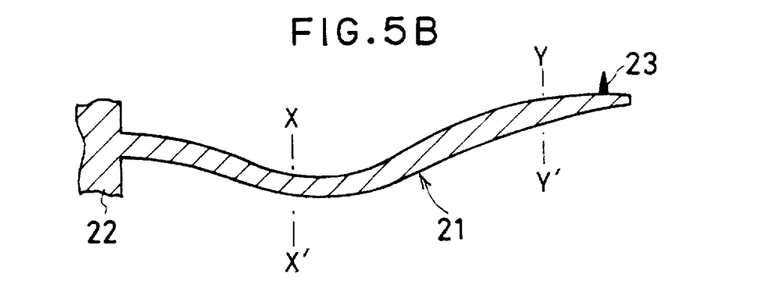
FIG. 5B is a cross-sectional view of the elastic body of FIG. 5A.
Figure 5C:
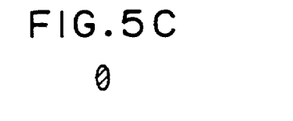
FIGS. 5C and 5D are cross-sectional views of the elastic body of FIG. 5B, respectively taken along lines X-X' and Y-Y'.
Figure 5D:
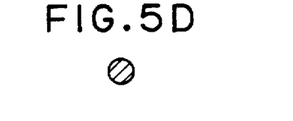

As understood from Equation (9), to achieve a high natural (resonant) frequency $f_{res}$ in the non-contact mode measurement, a large thickness t is preferred. In liquid, however, a high frequency oscillation is impracticable, and the thickness t is thus designed to be as small as that in the contact mode measurement. To reduce resistance in liquid, a moving portion, namely, an effective area of the oscillating portion perpendicular to the direction of oscillation is preferably made smaller. To this end, the cantilever 21 has preferably a narrow width W in Equation (10), and is configured, in cross section, to be substantially round and symmetrical relative to a plane perpendicular to the direction of motion or oscillation. When in the harmonic oscillation mode, for example, at the third harmonic, the cantilever 21 presents a 1/3 L portion from the free end 21a portion to a node 21b and a 2/3 L portion from the support 22 to the node 21b, and the tip portion is provided with a probe 23 as the free end portion 21a. The width of the free end portion 21a is designed to be narrower than that of the node 21b. As shown in FIGS. 5C and 5D, taken along lines X–X' and Y–Y' in FIG. 5B, the cantilever 21 is configured, in cross section, to be substantially round and symmetrical with respect to a plane perpendicular to the direction of oscillation.

Figure 6A:
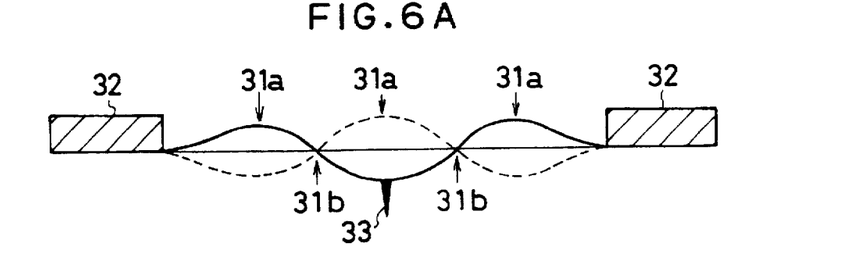
FIG. 6A and 6B are side and plan views showing the motive position of preferred elastic body of a dual fixed-end beam driven at harmonic modes.
Figure 6B:
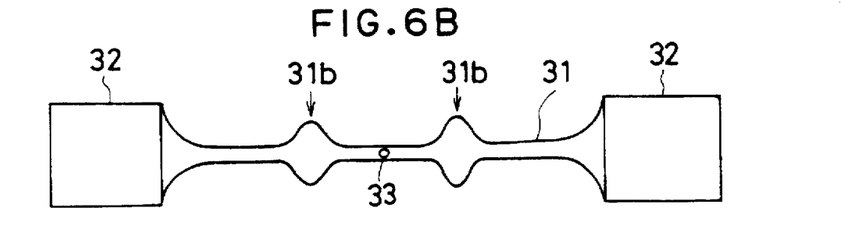

A dual fixed-end beam is considered as two cantilevers which are mutually joined on their free ends from both sides. FIGS. 6A and 6B are side and plan views of a harmonic oscillation mode elastic body, wherein the elastic body 31 is supported on its both ends by supports 32, 32, provided with a probe 33 on its center, and offers three free ends (loops) 31a and two nodes 31b. The dual fixed-end elastic body 31 has free ends 31a, as oscillatory portions, which are narrow in width to reduce viscous resistance and nodes 31b that are enlarged in width to increase viscous resistance for more stationary effect.

Figure 7:
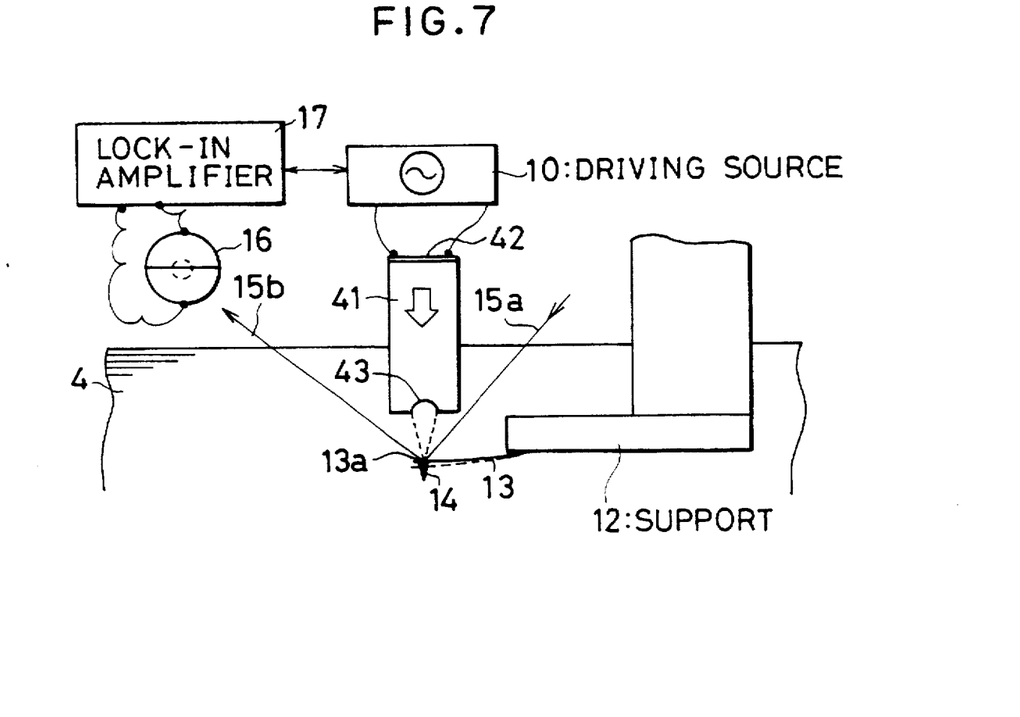
FIG. 7 is a diagram showing another embodiment of the present invention.

Referring to FIG. 7, another embodiment of the present invention is now discussed. In this embodiment, an elastic body is driven in the vicinity of its free end via a liquid by a driving source. In FIG. 7, a transducer 41 has on its one end a piezoelectric film 42 which is driven in a frequency range from 100 Hz to 100 kHz by a driving source 10. An acoustic wave within that range is emitted through an opening 43, and projected to the vicinity of the free end 13a of the elastic body 13 via a solution 4 to drive the elastic body 13. The timing of oscillation is set to be in synchronism with the displacement x(t) at the free end 13a of the elastic body 13 expressed by Equation (6). The incident light 15a derived from a laser light beam source is reflected off the free end of the elastic body 13, and the resulting reflected light 15b is then picked up by a position sensor 16. A lock-in amplifier 17 then detects a change in the frequency. In this embodiment, the oscillating driving force for the elastic body 13 is concentrated on the free end 13a, and the elastic body 13 is thus efficiently driven.

Figure 8A:
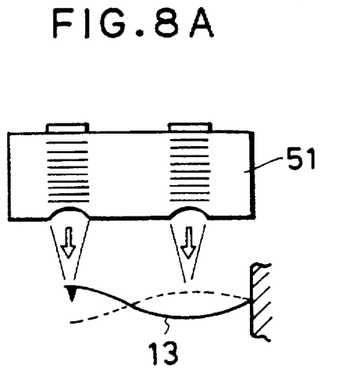
FIGS. 8A and 8B show another example of the transducer incorporated in the embodiment of FIG. 7.
Figure 8B:
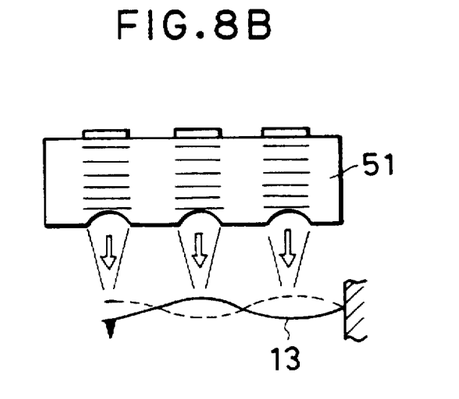

For the harmonic oscillation mode in this embodiment, a transducer 51 provided with a plurality of acoustic sources may be employed as shown in FIGS. 8A and 8B. Each acoustic wave from the corresponding acoustic source on the transducer 51 is projected toward the corresponding free end of the elastic body 13. The elastic body 13 is thus even more efficiently driven.

In above example, the sample is laid down on a stage. However, any modification which enables sample holding in a liquid is applicable to the present invention.

For example, the stage can be a transparent plate having a flat surface, which allows an optical observation under the stage by a microscope. A vessel having a flat bottom surface and surrounding walls made of transparent material, which holds a sample in a liquid can be put on the stage.

As has been discussed above referring to the embodiments, the present invention allows the non-contact mode measurement to be made to a sample held in a liquid by means of an elastic body having a probe at its free end without distorting the sample.

What is claimed is:

1. A probing apparatus for measuring a profile of a sample, comprising:

means for holding a sample in a liquid;

an elastic body having a probe at its free end, the elastic body having sufficient elasticity to be oscillated at its natural resonance frequency in the liquid;

a driving source for oscillating the elastic body in the vicinity of a harmonic of its natural resonance frequency; and a detecting device for detecting a variation in the oscillation of the elastic body when the tip of the probe is placed in close proximity to the sample without contacting the sample.

2. The probing apparatus according to claim 1, wherein the driving source drives the elastic body via the liquid in the vicinity of the free end of the elastic body.

3. The probing apparatus according to claims 1, wherein the elastic body has a cantilever configuration.

4. A probing apparatus for measuring a sample, comprising:

means for holding a sample in a liquid;

an elastic body having a probe at its free end, the elastic body having sufficient elasticity to be oscillated at its natural resonance frequency in the liquid;

a driving source for oscillating the elastic body in the vicinity of its natural resonance frequency; and a detecting device for detecting a variation in the oscillation of the elastic body when the tip of the probe is placed in close proximity to the sample without contacting the sample, wherein the driving source drives the elastic body via the liquid in the vicinity of the free end of the elastic body.

5. The probing apparatus according to claim 4, wherein the detecting device detects variations in the position of the elastic body.

6. The probing apparatus for measuring a sample comprising:

means for holding a sample in a liquid;

an elastic body having a probe at its free end, the elastic body having sufficient elasticity to be oscillated at its natural resonance frequency in the liquid;

a driving source for oscillating the elastic body in the vicinity of its natural resonance frequency; and a detecting device for detecting a variation in the oscillation of the elastic body when the tip of the probe is placed in close proximity to the sample, wherein the driving source drives the elastic body via the liquid of the vicinity of the free end of the elastic body, and wherein the driving source comprises an acoustic wave source arranged closely apart from and facing the free end of the elastic body.

7. A probing apparatus for measuring a sample, comprising:

means for holding a sample in a liquid;

an elastic body having a probe at its free end, the elastic body having sufficient elasticity to be oscillated at its natural resonance frequency in the liquid;

a driving source for oscillating the elastic body in the vicinity of its natural resonance frequency; and a detecting device for detecting a variation in the oscillation of the elastic body when the tip of the probe is placed in close proximity to the sample, wherein the elastic body has a dual fixed-end beam configuration.

8. The probing apparatus according to claim 7, wherein the elastic body is configured such that a node of a harmonic of the natural oscillation of the elastic body is subject to viscous resistance.

9. A probing apparatus for measuring a sample, comprising:

means for holding a sample in a liquid;

an elastic body having a probe at its free end, the elastic body having sufficient elasticity to be oscillated at its natural resonance frequency in the liquid;

a driving source for oscillating the elastic body in the vicinity of its natural resonance frequency; and a detecting device for detecting a variation in the oscillation of the elastic body when the tip of the probe is placed in close proximity to the sample, wherein the area of the elastic body perpendicular to the direction of oscillation is variable.

10. The probing apparatus according to claim 9, wherein the transverse cross-section of the elastic body is variable in order to reduce viscous resistance working on the elastic body in its oscillation motion.

11. The probing apparatus for measuring a sample, comprising:

means for holding a sample in a liquid;

an elastic body having a probe at its free end, the elastic body having sufficient elasticity to be oscillated at its natural resonance frequency in the liquid;

a driving source for oscillating the elastic body in the vicinity of its natural resonance frequency; and a detecting device for detecting a variation in the oscillation of the elastic body when the tip of the probe is placed in close proximity to the sample, wherein the driving source drives the elastic body via the liquid in the vicinity of the free end of the elastic body, wherein the elastic body has a cantilever configuration, and wherein the elastic body is configured such that a node of a harmonic of the natural resonance oscillation frequency of the elastic body is subject to viscous resistance.

12. The probing apparatus for measuring a sample, comprising:

means for holding a sample in a liquid;

an elastic body having a probe at its free end, the elastic body having sufficient elasticity to be oscillated at its natural resonance frequency in the liquid;

a driving source for oscillating the elastic body in the vicinity of its natural resonance frequency; and a detecting device for detecting a variation in the oscillation of the elastic body when the tip of the probe is placed in close proximity to the sample, wherein the elastic body has a dual fixed-end beam configuration, and wherein a width of the elastic body at its oscillating portion is narrower than the width of a node of the elastic body, the width being perpendicular to the direction of the oscillation.

* * * * *